United States Patent Office 3,003,945
Patented Oct. 10, 1961

3,003,945
SEPARATION OF ASPHALT-TYPE BITUMINOUS MATERIALS WITH ACETONE
Leo Garwin, Oklahoma City, Okla., assignor to Kerr-McGee Oil Industries, Inc., a corporation of Delaware
No Drawing. Continuation of application Ser. No. 435,351, June 8, 1954. This application Nov. 5, 1958, Ser. No. 771,963
8 Claims. (Cl. 208—45)

The present invention relates to a process for separating an asphalt-type bituminous material into two or more fractions. More particularly, the present invention relates to an improved process for separating an asphalt-type bituminous material into at least two fractions at a greatly improved rate of separation by use of a selective solvent.

This application is a continuation of my copending application Serial Number 435,351, filed June 8, 1954, now abandoned.

By the term "asphalt-type bituminous material" as used in this specification including the claims is meant bituminous residues obtained by refining hydrocarbons (crudes), naturally occurring asphalts (bitumens and pyrobitumens), one or more fractions or components thereof, or products obtained by blowing these materials or one or more of their components or fractions with air or another oxygen-containing gas in the presence or absence of catalysts. Examples of naturally occurring asphalts include gilsonite, grahamite, wurtzilite, albertite, elaterite, native asphalts, such as Trinidad asphalt, etc. Blown asphalt-type bituminous materials include those blown either in the presence or absence of catalysts such as phosphorous pentoxide, ferric chloride, cobaltic salts, etc. By the term "one or more fractions or components thereof" is meant an asphalt-type bituminous material from which a portion or the total asphaltene content has been removed, for example, by the method described in copending application Serial Number 218,480, filed March 30, 1951, or an asphalt-type bituminous material from which the asphaltenes as well as a portion of the resin content has been removed by, for example, the same method.

Since asphalt-type bituminous materials are highly complex mixtures of a very large number of compounds covering a wide range of structures and molecular weights, it is customary to characterize their composition by solubility in definite amounts of arbitrarily selected solvents. Thus when, for example, such a material is thoroughly mixed at room temperature with a paraffin hydrocarbon solvent containing from four to eight carbon atoms, inclusive, and certain other solvents, the undissolved portion settling out as solids is classified ordinarily as "asphaltenes" and the soluble portion as "a mixture of resins and oils" or as "petrolenes." Since the amount of material that settles out varies somewhat with each of these solvents, the undissolved portion is sometimes more specifically designated as "normal pentane asphaltenes," "isopentane asphaltenes," etc.

As a rule, the average molecular weight and structural complexity increase from the oily to the resinous fraction and finally to the undissolved fraction or asphaltenes. Generally, these three fractions or categories differ in their physical and chemical behavior. However, it is believed that there are individual members of each group which are borderline cases and which may fall into one fraction or category or another depending upon the treatment used, e.g., the kind and amount of solvent. Hence, from the foregoing discussion of the nature of asphalt-type bituminous materials, it will be appreciated that the terms "asphaltenes," "resins" and "oils," as applied to asphalt-type bituminous materials refer to broad classes or categories of the constituents of asphalt-type bituminous materials, the exact composition being dependent upon the particular asphalt-type bituminous material from which they were derived, the agents, such as solvents, employed for separating these fractions from each other, the conditions including solvent volume and temperature employed for carrying out the separation, and a number of other factors. Nevertheless, these terms provide a convenient means for those skilled in the art to refer to broad classes of the constituents of asphalt-type bituminous materials which do possess varied chemical and physical properties even though, for example, an asphaltene may contain some constituents which are the same as those occurring in the resins.

Each of the fractions or categories into which asphalt-type bituminous materials may be separated is useful for purposes for which the parent material is not suitable or when used for the same purpose, gives results which are new and useful. Thus, when the parent material is steam or vacuum-reduced asphalt, the oils have lubricating properties, the resins are useful in coating compositions and as extenders in plastics manufacture and the asphaltenes are useful as rubber extenders and in coating compositions. Also, the resins, oils and asphaltenes may be used singly or in combination as additives to modify the properties of asphalt-type bituminous materials.

Copending application Serial Number 218,480, filed March 30, 1951, now U.S. Patent No. 2,783,188 describes a method of separating asphalt-type bituminous materials into three fractions or categories, namely, the asphaltenes, the resins and the oils. In accordance with this method, the asphaltenes are separated from the resin-oil mixture or petrolene content by treating the asphalt charge with normal pentane or a similar solvent under ambient temperature conditions and allowing the asphaltenes to settle out. Asphaltenes separated in this manner settle out very slowly due to the flocculent nature of the asphaltene particles. Asphaltene floc is very light and coarse and consequently the asphaltenes settle out only when several small floc particles combine through physical contact to form a larger particle. Asphaltenes from blown asphalts are particularly difficult to handle. They frequently settle out at one-tenth or one-twentieth of the rate exhibited by asphaltenes from vacuum-reduced asphalts. Many attempts have been made to improve the settling rate of the asphaltenes. All of these attempts have resulted in methods possessing notable disadvantages. The more important methods used to improve the settling rate of asphaltenes and a discussion of the disadvantages of these methods may be summarized as follows:

(a) Centrifuging of the asphaltene suspension is satisfactory insofar as the physical separation obtained is concerned. However, the equipment in which the centrifuging is carried out is quite costly and the operating charges are high.

(b) Filtration methods have not been too successful. Due to the compressible nature of the floc, the pressure under which filtration may be carried out must be low to avoid compaction and plugging of the filter. The over-all filtration rate is consequently low. Filter aids have been used, both as precoats and as part of the mixture, to increase the filtration rate. Improvement of the filtration rate has been achieved by this, but the addition of a filter aid increases the cost and creates a subsequent problem of removing the filter aid from the finished asphaltene product.

(c) Gravity settling has a number of disadvantages and because of the low settling rate under ordinary conditions of temperature and pressure, expensive thickeners are required. The selling rate can be improved significantly by raising the temperature of settling, the upper temperature limit being the boiling point of the solvent. Even below the boiling point, convection currents may be serious. Furthermore, should the settled solid floc be allowed by accident or plant shut-down to stand in the settler without agitation and removal, it would compact and the degree of compaction would be so great that after a twenty-four hour period it would be necessary to remove the solids by hand or by mechanical means.

Another serious disadvantage connected with the conventional separation of asphaltenes in the gravity settler results from the fact the asphaltenes cannot be removed continuously from the bottom of the thickener in dry form. It is necessary to incorporate enough liquid to provide the necessary fluidity for pumpability. In most cases, at least one or two volumes of liquid are required per volume of solid to give a pumpable slurry. Under such conditions, contamination of the asphaltene fraction by the resins and oils dissolved in the liquid removed along with the solid is inevitable. Multiple-countercurrent thickening and washing would eliminate this, but the cost is practically prohibitive.

The separation of the petrolene fraction into separate resin and oil fractions also poses difficult problems. For example, in the percolation process described in copending application Serial Number 218,480, filed March 30, 1951, the separation of the resin-oil mixture in hydrocarbon solvent involves contact with a moving bed adsorbent such as clay, alumina, etc. The resins are preferentially adsorbed. The clay containing the adsorbed resins must in turn be treated with an eluant to remove the resins from the clay and to allow the clay to be recycled into the system. The resins as produced in this manner have a softening point in the neighborhood of 170 to 180° F. and a penetration at 77° F. of 1–2. Thus, the characteristics of the resin fraction and its yield are fairly definitely fixed. There is not much in the way of latitude of operation to produce a variety of resin fractions of different physical characteristics. Further, it is necessary that the eluant be removed from the resin, usually by distillation, in order that it may be recycled in the system. The percolation process as operated in this fashion is expensive because it requires large quantities of circulating clay, expensive mechanical equipment for moving the clay from one part of the system to the other and appreciable clay make-up because of attrition of the clay particles and decreasing capacity of the clay for resin as it is used over and over again. In addition, this process brings about attendant problems due to erosion of the steel equipment by the moving clay particles, involves difficulty in control because of the need to measure the amount of clay circulation, and involves special design of clay contactors to prevent bridging and loss of circulation of the clay. There are, to be sure, other processes for separating the resins and oils from each other. However, these processes involve difficulties equally as great, if not greater, than those set forth above in connection with the percolation process.

Accordingly, it is a principal object of the present invention to provide an improved method for separating an asphalt-type material into at least two fractions.

It is a further object of the present invention to provide an improved method for separating the asphaltene fraction or a portion thereof from an asphalt-type material in a manner which eliminates the difficulties of low settling rate obtained when separating asphaltenes in the conventional manner.

A further object of the present invention is to provide an improved method for separating the asphaltene fraction or a portion thereof from an asphalt-type material in a manner permitting continuous operation to be used instead of the usual batch process techniques.

A further object of the present invention is to provide a method for separating the petrolene fraction of an asphalt-type material into at least two fractions, one of which contains the resins and the other of which contains the oils.

Another object of the present invention is to provide a process for separating an asphalt-type bituminous material into a plurality of fractions, each of which, because of the selectivity of separation of the process, possesses different physical and chemical properties.

These and other objects of the present invention will become more apparent upon considering the following description of the present invention.

The present invention resides in the discovery that at least two fractions of an asphalt-type bituminous material may be obtained, one of them being in the liquid phase and the other being dissolved in the solvent when a specific solvent is employed in certain volume ratios at specific elevated temperature and pressure conditions. Since the insoluble fraction may be separated from the asphalt-type bituminous material in liquid phase and this separation occurs rapidly, the process lends itself to continuous operation. In accordance with the present invention, acetone when employed in certain volume ratios at specific elevated temperature and pressure conditions will accomplish the objects and purposes of this invention.

The selection of the volume ratio of acetone to asphalt-type bituminous material is, in accordance with the present invention, critical insofar as there is a minimum acetone to asphalt-type bituminous material volume ratio which is about 2:1. Where solvent to asphalt-type bituminous material volume ratios are less than 2:1, complete miscibility of the solvent and asphalt-type bituminous material is obtained and separation of the bituminous material into its constituent fractions becomes impossible. Increase of the volume ratio of acetone to asphalt-type bituminous material from about 2:1 to about 10:1 may increase, decrease or leave unchanged the percent yield of asphaltenes depending on the asphaltic-type material being treated and the temperature and pressure being used. As the volume ratio is increased above this latter value, the percentage yield does not appear to change significantly. Thus the selection of the volume ratio up to a value of 10:1 is determinative to some extent of the percentage yield of asphaltenes obtained and consequently offers measures for varying the properties of the asphaltene fractions. Using volume ratios above this latter value is of no apparent operational advantage but does offer economic as well as operational disadvantages.

In accordance with the present invention, I have discovered the temperature employed must exceed 200° F. in order to obtain the separation of a fraction which is in the liquid phase. In other words, it is necessary to operate at or above this temperature in order for a bulk interface to form between the separated fraction and the acetone solution of residual asphalt-type material. At temperatures below this level acetone causes the precipitation of a fraction, but this fraction is either semi-solid or solid.

The maximum temperature of operation for the purpose of separating a liquid phase fraction comprising the total asphaltenes of the asphalt-type bituminous material treated is approximately 50° F. below the critical temperature of acetone. At values just above this temperature, the density change of acetone is so rapid that not only does an asphaltene fraction separate in liquid phase, but a portion of the resin content of the asphalt-type bituminous material begins to separate.

Selection of an operating temperature between 200° F. and about 50° F. below the critical temperature of the particular solvent employed provides a convenient means for separating different fractions of asphaltenes from the asphalt-type bituminous material. This is a particularly important feature of the present invention since it provides a method for obtaining different yields of asphaltenes from a particular asphalt-type bituminous material. Variation in the yield results in fractions possessing different physical and chemical properties.

When operating within the aforesaid range of temperature for obtaining a liquid phase asphaltene fraction or a plurality of such fractions, it is of course essential that the pressure employed be not less than the equilibrium vapor pressure of acetone at its temperature. Higher pressures may, however, be employed. Utilization of these higher pressures, however, does not have any great effect upon the percentage yield of asphaltenes. In other words, the percentage yield is primarily a function of temperature.

Besides the fact that treatment of one volume of asphalt-type bituminous material with at least two volumes of acetone at the stated elevated temperature and pressure conditions yields asphaltenes in the liquid phase, acetone is an excellent solvent for a number of other reasons. For example, the percentage yield of asphaltenes is fairly constant over a fairly wide temperature range, 100 or more degrees, and this permits a fairly wide choice of operating conditions. Furthermore, when operating within this wide temperature range, not only is an asphaltene fraction in the liquid phase obtained but the percentage yield is comparable to that obtained when operating with n-pentane either at room temperature and atmospheric pressure conditions or under the conditions described in copending application Serial Number 377,201, filed August 28, 1953, now abandoned. In addition, most of the known applications for asphaltenes require a product having a softening point of 300° F. or above. The asphaltene fraction obtained with acetone in accordance with the process of this invention has such a softening point. In this connection it is surprising that acetone will yield asphaltene fractions in the liquid phase having softening points of 300° F. or above while operating at a temperature, for example 225° F., considerably below the softening point of the obtained fraction.

The residual or petrolene fraction dissolved in acetone may be separated from acetone by flashing and thus produce a product having properties useful, for example, in the paint, varnish and enamel industries. If, however, it is desirable to recover separate fractions of oils and resins, it is possible, in accordance with the present invention, to obtain such fractions by increasing the prevailing temperature conditions of the petrolene fraction dissolved in acetone.

In order to recover the resin fraction or a portion thereof from the petrolenes in solution, it is simply necessary to increase the temperature above 50° F. below the critical temperature of the hydrocarbon solvent while maintaining the pressure at a value at least equal to the vapor pressure of acetone.

Surprisingly, the critical temperature (455° F.) of acetone is not the maximum temperature at which the resin fraction may be recovered in the liquid phase from the petrolenes in solution. As a matter of fact, I have discovered that temperatures appreciably in excess of the critical temperature of acetone may be employed for separating the resin fraction in the liquid phase from the petrolenes in solution while leaving the oils in solution, providing the pressure employed is of the proper choice. The upper limit of operative temperature is that at which decomposition of acetone or the asphalt-type bituminous material begins to take place.

In the case of operating below the critical temperature but within 50° F. thereof, the pressure employed must not be less than the vapor pressure of acetone at the temperature selected. In the case of temperature conditions exceeding the critical temperature of acetone, the pressure employed for a given temperature must not be less than the value obtained by extrapolating the vapor pressure curve in accordance with the Cox vapor pressure chart using water as a reference substance. Extrapolation of the vapor pressure of acetone in accordance with the Cox vapor pressure chart using water as a reference substance determines the minimum pressure that may be employed at a temperature above the critical temperature of the solvent for obtaining the resins as a separate liquid phase from the petrolenes dissolved in acetone.

The construction of a Cox vapor pressure chart using water as a reference substance is understood by those skilled in the art. Briefly, from a mathematical viewpoint, vapor pressure should be related to temperature as follows:

$$\log P = \frac{-A+B}{T}$$

where P is the pressure, T is the boiling point and A and B are constants. Cox found that if a constant is added to the temperature term of this equation, a straight line plot results on semi-logarithmic graph paper. Such a method of plotting is widely used, and one common empirical formula is:

$$\log P = \frac{-A}{T+382} + B$$

where T is the boiling point in degrees Fahrenheit at pressure P, and A and B are constants.

Now if we construct a vapor pressure curve for water by plotting pressure as the ordinate on a logarithmic scale and temperature as the abscissa, a straight line vapor pressure curve may be obtained by selecting an arbitrary scale for the temperature values corresponding to specific vapor pressures at these temperatures. Utilizing the temperature scale arbitrarily selected for providing a straight line vapor pressure curve for water, and using the same logarithmic scale for pressure values, Cox found that the vapor pressure curve of acetone, among other solvents, may also be plotted and that the resulting curve is a straight line. Values for plotting this straight line vapor pressure curve for acetone may be determined by known temperature-vapor pressure relationships at temperatures below the critical. This straight line may be extrapolated to temperatures beyond the critical temperature of the solvent and the result is an extrapolation of the vapor pressure curve in accordance with the Cox vapor pressure chart using water as a reference substance. An example of such extrapolation for a number of solvents may be found in the sixth edition of the Engineering Data Book of the Natural Gasoline Supply Men's Association, Tulsa, Oklahoma, 1951. The particular chart occurring therein is a Cox vapor pressure chart constructed by Norman K. Rector.

By separating the resin fraction or a portion thereof by operation at temperature conditions above 50° F. below the critical temperature and at pressure conditions hereinbefore defined, the resin fraction may be withdrawn in the liquid phase from the separation zone leaving the oil content or fraction of the asphalt-type bituminous material in solution in acetone. A convenient means for recovering the oil from acetone subsequent to the separation of the resin fraction is by simple flashing of the solvent followed, if necessary, by distillation to remove any residual solvent retained by the oil.

Preferably, however, in accordance with the present invention, recovery of the oil or any residual fraction such as a mixture of oils and resins is obtained by maintaining the pressure of operation used in separating the last fraction and simply increasing the temperature to a value above the equilibrium temperature of the solvent at the prevailing pressure. By "equilibrium temperature" as used here and in the claims is meant, at temperatures below the critical, the actual saturation temperature of the solvent for the pressure in question, and at temperatures above the critical temperature, the temperature corresponding to the prevailing pressure as determined by a Cox vapor pressure curve extrapolation using water as the reference substance. By this preferred means of separation, a major portion of the heat content of the separated solvent may be recovered by heat exchange against a solvent-rich phase of any previous fraction resulting from the removal of constituents of the asphalt-type bituminous material and may then be used in the process, for example, as feed to the first fractionating stage where a high pressure solvent is required.

In copending application Serial No. 377,201, there is described a process scheme for continuous operation in the separation of an asphaltene fraction, a resin fraction, and oil fraction from an asphalt-type bituminous material employing certain selective hydrocarbon solvents. The process scheme described there is equally applicable to the present invention which employs acetone as a solvent. Specific data presented hereinafter will illustrate the temperature and pressure conditions satisfactory for operating in accordance with this processing scheme when employing acetone as the solvent.

Although acetone is satisfactory for the purpose of the present invention, its homologue, methyl ethyl ketone, is not. Thus, when methyl ethyl ketone is used for the treatment of a 117° F. softening point, 87 penetration at 77° F. asphalt at temperatures and pressures in accordance with the present invention, there is no precipitation but instead a complete solution of the entire asphalt sample. In other words, methyl ethyl ketone has too high a solvent power for such an asphalt. However, when treating highly blown asphalts, such as steep roofing blown asphalt having a 195° F. softening point at elevated temperature and pressure conditions, the separation of asphaltenes is obtained in the liquid phase.

The following examples are for the purpose of illustration and are not limiting to the scope of the present invention which is set forth in the claims.

*Example I*

The following tabulated data illustrates the separation of a 117° F. softening point, 87 penetration of 77° F. vacuum-reduced asphalt into an asphaltene fraction and a resin-oil fraction in accordance with the method of the present invention when using acetone as the solvent. For the purpose of comparison, data is also included which illustrates the separation of the same asphalt-type bituminous material using conventional technique of atmospheric pressure at room temperature. A solvent to material volume ratio of 10 to 1 is used.

| Temp., ° F. | Press., p.s.i.g. | Asphaltene Fraction | | Resin-Oil Fraction | |
|---|---|---|---|---|---|
| | | Yield, percent | Soft. Pt., ° F. | Yield, percent | Soft. Pt., ° F. |
| 75 | 0 | 54 | 215 | 46 | too soft |
| 233 | 65 | 30.4 | 308 | 69.6 | 79 |

In the case of employing a temperature of 75° F. and atmospheric pressure the asphaltene fraction separated was in the solid state. However, when employing the recorded higher temperature and pressure conditions, the separated asphaltene fraction was in the liquid state and was easily withdrawn from the equilibrium vessel.

*Example II*

The resin-oil fraction of 69.6% by weight of the original vacuum-reduced asphalt of Example I and having a softening point of 79° F. is subjected to increased temperature and pressure conditions in order to obtain a resin fraction in the liquid phase as follows:

| Temp., ° F. | Press., p.s.i.g. | Wt. Percent of Resin (based on resin-oil wt.) | Remarks |
|---|---|---|---|
| 410 | 485 | 11 | Solvent stable under equilibrium conditions. |
| 470 | 800 | 20 | Do. |

After removal of the liquid resin phase, the oils are recovered from solvent solution by simple flashing.

*Example III*

The following tabulated data illustrates the separation of a 195° F. softening point steep roofing asphalt into an asphaltene fraction and a resin-oil fraction in accordance with the method of the present invention when using acetone as the solvent with a solvent to material volume ratio of 10:1.

| Temp., ° F. | Press., p.s.i.g. | Asphaltene Fraction | | Resin-Oil Fraction | |
|---|---|---|---|---|---|
| | | Yield, percent | Soft. Pt., ° F. | Yield, percent | Soft. Pt., ° F. |
| 250 | 80 | 69.9 | 248 | 30.1 | 74 |

*Example IV*

The resin-oil fraction of Example III is subjected to increased temperature and pressure conditions in order to obtain a resin fraction in the liquid phase as follows:

| Temp., ° F. | Press., p.s.i.g. | Wt. Percent of Resin (based on resin-oil wt.) | Remarks |
|---|---|---|---|
| 460 | 777 | 9.5 | Slight decomposition of acetone. |

What is claimed is:

1. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, and withdrawing the liquid phase asphaltene fraction from the treating zone.

2. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least four volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, and withdrawing the liquid phase asphaltene fraction from the treating zone.

3. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least 300° F.

4. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, and then increasing the temperature of the lighter solvent fraction containing dissolved residual apshalt-type bituminous material to a temperature above the equilibrium temperature of the solvent at the prevailing pressure to separate the solvent.

5. A method of separating an asphalt-type bituminous material including asphaltenes, resins and oils into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, separating a fraction of residual asphalt-type bituminous material from a lighter solvent fraction containing oils by treating in a treating zone under further elevated temperature and pressure conditions the lighter solvent fraction containing dissolved residual asphalt-type bituminous material the temperature of this treatment being greater than about 400° F. and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, and withdrawing the liquid phase fraction of residual asphalt-type bituminous material from the treating zone.

6. A method of separating an asphalt-type bituminous material including asphaltenes, resins and oils into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least four volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treatment being greater than about 400° F. and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, and withdrawing the liquid phase fraction of residual asphalt-type bituminous material from the treating zone.

7. A method of separating an asphalt-type bituminous material including asphaltenes, resins and oils into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, the asphaltene fraction having a softening point of at least 300° F., separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treatment being greater than about 400° F. and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, and withdrawing the liquid phase fraction of residual asphalt-type bituminous material from the treating zone.

8. A method of separating an asphalt-type bituminous material including asphaltenes, resins and oils into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of acetone, the temperature of treatment being between 200° F. and about 400° F. and the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treatment being greater than about 400° F. and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, withdrawing the liquid phase fraction of residual asphalt-type bituminous material from the treating zone, and then increasing the temperature of the lighter solvent fraction containing oils to a temperature above the equilibrium temperature of the solvent at the prevailing pressure to separate the solvent.

References Cited in the file of this patent

UNITED STATES PATENTS

| | | |
|---|---|---|
| 2,130,147 | Milmore | Sept. 13, 1938 |
| 2,276,155 | Carr | Mar. 10, 1942 |
| 2,337,448 | Carr | Dec. 21, 1943 |